(12) United States Patent
Pons Puig et al.

(10) Patent No.: US 12,494,737 B2
(45) Date of Patent: Dec. 9, 2025

(54) STRUCTURE MADE UP OF FLOATING PHOTOVOLTAIC PANELS

(71) Applicant: ISIGENERE, S.L., Beneixama Alicante (ES)

(72) Inventors: Emilio Pons Puig, Beneixama Alicante (ES); Miguel Redón Santafé, Beneixama Alicante (ES); Juan Ángel López Martinez, Valencia (ES); Hugo Coll Carrillo, Valencia (ES)

(73) Assignee: ISIGENERE, S.L., Beneixama Alicante (ES)

( * ) Notice: Subject to any disclaimer, the term of this patent is extended or adjusted under 35 U.S.C. 154(b) by 0 days.

(21) Appl. No.: 18/560,839

(22) PCT Filed: Nov. 11, 2022

(86) PCT No.: PCT/ES2022/070730
§ 371 (c)(1),
(2) Date: Nov. 14, 2023

(87) PCT Pub. No.: WO2023/084141
PCT Pub. Date: May 19, 2023

(65) Prior Publication Data
US 2024/0258963 A1     Aug. 1, 2024

(30) Foreign Application Priority Data
Nov. 11, 2021   (ES) ................ ES202132238

(51) Int. Cl.
*H02S 30/10*   (2014.01)
*H02S 20/30*   (2014.01)
*H02S 40/36*   (2014.01)

(52) U.S. Cl.
CPC .............. *H02S 30/10* (2014.12); *H02S 20/30* (2014.12); *H02S 40/36* (2014.12)

(58) Field of Classification Search
CPC ....... H10F 19/00–908; H02S 10/00–40; H02S 20/00–32; H02S 30/00–20
See application file for complete search history.

(56) References Cited

U.S. PATENT DOCUMENTS

| 2011/0232727 | A1* | 9/2011 | Cangini | F24S 20/70 136/251 |
| 2012/0304912 | A1 | 12/2012 | Jeong | |
| 2012/0305051 | A1* | 12/2012 | Kokotov | B63B 35/44 136/246 |

FOREIGN PATENT DOCUMENTS

| CN | 206218154 U | 6/2017 |
| CN | 206237349 U * | 6/2017 |

(Continued)

OTHER PUBLICATIONS

CN-206727931-U English (Year: 2017).*

(Continued)

*Primary Examiner* — Bach T Dinh
(74) *Attorney, Agent, or Firm* — CANTOR COLBURN LLP

(57) ABSTRACT

A structure made up of floating photovoltaic panels, the structure includes several assemblies made up of a photovoltaic panel and floating support and connection components between the floating supports, so that the assemblies form a floating matrix. Mooring components formed by weights and ropes or rubber elements are connected at the lower end thereof to the weight, the upper end of each rope or rubber element being connected to the floating frame. The floating frame is a semi-rigid frame, wherein the floating frame is made up of a matrix of a cementitious product which fully or partially surrounds a volume of floating material.

12 Claims, 10 Drawing Sheets

(56) References Cited

FOREIGN PATENT DOCUMENTS

| CN | 206727931 U | * | 12/2017 | |
|---|---|---|---|---|
| CN | 207354114 U | * | 5/2018 | ............ B63B 35/44 |
| CN | 209211396 U | * | 8/2019 | ............ E01D 19/02 |
| CN | 111483035 A | * | 8/2020 | |
| ES | 2844192 T3 | | 7/2021 | |
| JP | H0224286 A | | 1/1990 | |
| JP | 2007124972 A | * | 5/2007 | |
| KR | 20140052722 A | | 5/2014 | |
| KR | 101562814 B1 | | 10/2015 | |
| KR | 20160083442 A | | 7/2016 | |
| NL | 0361615 A1 | * | 4/1990 | |
| WO | WO-2016185267 A1 | * | 11/2016 | |

OTHER PUBLICATIONS

CN-207354114-U English (Year: 2018).*
CN-206237349-U English (Year: 2017).*
JP-2007124972-A English (Year: 2007).*
CN-209211396-U English (Year: 2019).*
CN-111483035-A English (Year: 2020).*
International Search Report for International Application No. PCT/ES2022/070730, dated Feb. 1, 2023, 4 pages.

* cited by examiner

STRUCTURE MADE UP OF FLOATING PHOTOVOLTAIC PANELS

CROSS-REFERENCE TO RELATED APPLICATIONS

This application is a 35 U.S.C. § 371 National Stage patent application of PCT/ES2022/070730, filed on 11 Nov. 2022, which claims the benefit of Spanish patent application U202132238, filed on 11 Nov. 2021, the disclosures of which are incorporated herein by reference in their entirety.

TECHNICAL FIELD

The present disclosure relates to a structure made up of floating photovoltaic panels, particularly those located in reservoirs with a certain depth or level variation, those subjected to considerable waves or fetch, and those located at sea (nearshore or offshore).

BACKGROUND

The floating solar energy sector has grown significantly in the last decade, catalysed by the improved performance of solar panels with cooling that occurs near the water, the fact that it does not require earth movement and given the proximity of an electrical outlet in the case of reservoirs. In these systems, solar panels are usually placed on plastic floats, which are connected to one another. Given the characteristics of the material, these connections are unable to transmit significant loads, meaning that in situations with large waves the structure must be moored at many points, with the resulting extra cost in mooring lines. This extra cost increases as environmental events become more intense, as the structure becomes larger and as the depth of the reservoir increases.

One of these known systems comprises several assemblies made up of a photovoltaic panel and floating support and connection means between the floating supports, so that the assemblies form a floating matrix, and mooring means for mooring the structure, the mooring means comprising a plurality of weights and chains connected at the lower end thereof to the weight, and the structure comprising a floating frame, the upper end of each chain being connected to the floating frame.

One example of this system is described in document ES 2 844 192 T3. In this system, the floating frame consists of a ring formed by one or more floating tubes. Anchors are placed at various points on the tube where the mooring ropes or rubber elements are lowered.

One drawback of this system is that the frame can be deformed, it cannot withstand strong impacts, and it cannot withstand high traction at the anchor points.

SUMMARY

To overcome the drawbacks of the state of the art, the present disclosure proposes a structure made up of floating photovoltaic panels, said structure comprising several assemblies made up of a photovoltaic panel and floating support and connection means between the floating supports, so that the assemblies form a floating matrix, and mooring means for mooring the structure, the mooring means comprising a plurality of weights and ropes or rubber elements connected at the lower end thereof to the weight, and the structure comprising a floating frame with a bending rigidity significantly higher than that of the connected floating supports, the upper end of each rope or rubber element being connected to the floating frame.

The claimed rigidity is important because it allows the following:

On the vertical axis, the number of moorings to the bottom of the reservoir is reduced. If the part is considerably rigid, bending moments can be transmitted between the different parts that make up the frame and therefore, with few mooring points, the connected docks will have reduced and admissible draft variations.

On the horizontal axis, the rigidity of the frame allows for more horizontal pulling of the plastic floats to be distributed over a reduced number of moorings to the bottom of the reservoir. Since the moorings have a certain inclination, transverse rigidity prevents the horizontal component of the forces from generating excess unwanted curvature in plan view.

The disclosure is more competitive the greater the mooring depth (where each line used is more expensive) and the more intense the wave conditions, since the frame protects the plastic floats in order to provide the structure with the useful life required. It can also be competitive in marine waters, where the intensity of the waves and currents do not allow systems with plastic floats to be installed.

In some embodiments, the floating frame is made up of a matrix of cementitious product which fully or partially surrounds a volume of floating material.

In some embodiments, the cementitious product is a concrete with fibres.

In some embodiments, the cementitious product is an Ultra-High Performance Concrete (UHPC).

Ultra-High Performance Concrete (UHPC) makes it possible to have a long-lasting solution, since the material is very compact, has low porosity and is lightweight, such that the number of reinforcements and the coatings thereof can be reduced. In particular, the weight of the part is reduced to less than half of a solution that could be designed with conventional concrete. This lightness reduces transportation and installation costs and increases freeboard compared to a normal concrete part with the same depth.

In some embodiments, the fibres are made of steel and are present in a content greater than 1% by volume.

In some embodiments, the maximum aggregate size is less than 8 mm and/or the water/cement ratio is less than 0.35.

In some embodiments, the frame is made up of parts with a length comprised between 13 and 14 m, a width comprised between 1.6 and 1.8 m, and a depth comprised between 0.4 and 0.6 m. These parts are connected to each other in a semi-rigid manner, such that the connection can transmit part of the bending moment between the parts.

The length is conditioned by the maximum lengths of a conventional transport lorry, the width is conditioned by the wave mitigation desired for the location where the structure, which partially acts as a breakwater, is going to be installed, and the depth is conditioned by the desired freeboard for the part in service.

It is noted that the frame of the disclosure is intended to have substantial dimensions. In particular, it is noted that the dimensions indicated in FIG. 3 are expressed in metres and the size of the parts P relative to the size of a person, which is illustrated with manufacturing photographs 6 to 13, is also noted.

In some embodiments, the cross-section of the part is a lightened rectangle, such that a box girder is formed where longitudinal reinforcements embedded in the cementitious material are positioned at each of the four edges to provide bending strength on both axes. Every certain distance in the direction of the long axis, there is an inner solid between the lightening elements. These transverse diaphragms represent filled sections that provide transverse strength to the part and reduce the deformability thereof. The thickness of the part varies between 30 and 70 mm depending on the area. The webs of the box girder have a slight inclination to facilitate the removal of the prefabricated part from the mould.

The frame is preferably made up of parts with a length of 13.4 m, a width of 1.82 m, and a height of 0.51 m.

In some embodiments, the floating material is EPS.

The different aspects and embodiments of the disclosure defined above may be combined together, provided that they are mutually compatible.

Additional advantages and features of the disclosure will become apparent from the detailed description that follows and will be particularly indicated in the attached claims.

BRIEF DESCRIPTION OF THE DRAWINGS

As a complement to the description, and for the purpose of helping to make the features of the disclosure more readily understandable, in accordance with practical exemplary embodiments of the disclosure, said description is accompanied by a set of figures which, by way of illustration and not limitation, represent the following.

DETAILED DESCRIPTION OF THE DRAWINGS

In the description of the possible preferred embodiments of the disclosure, numerous details must be provided to better understand the disclosure. Even so, it will be apparent to the person skilled in the art that the disclosure can be implemented without these specific details. Furthermore, well-known features have not been described in detail to avoid unnecessarily complicating the description.

Figure 1:
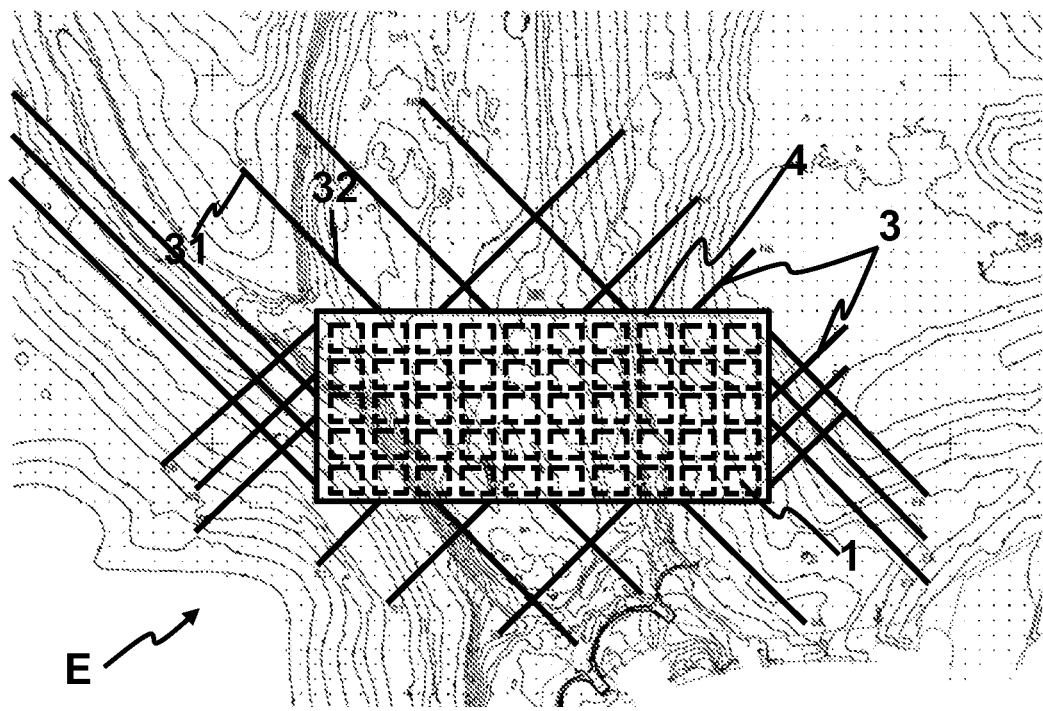
FIG. 1 shows a plan view of an anchored installation.

FIG. 1 shows a plan view of a structure E made up of floating photovoltaic panels PV, said structure arranged in a reservoir.

Figure 3:
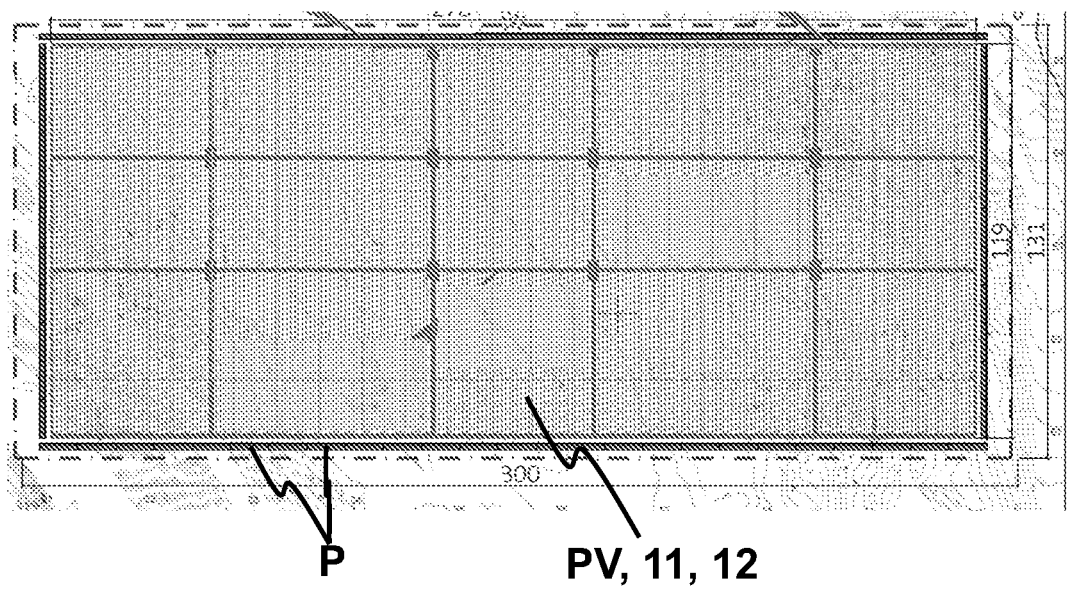
FIG. 3 shows a plan view of an installation, where the perimeter portion is the frame and the inner portion are the plastic floats with solar panels.

As shown in FIG. 3, the structure comprises several assemblies 1 made up of a photovoltaic panel 11 and floating support 12 and connection means between the floating supports 12, so that the assemblies 1 form a floating matrix.

Figure 14:
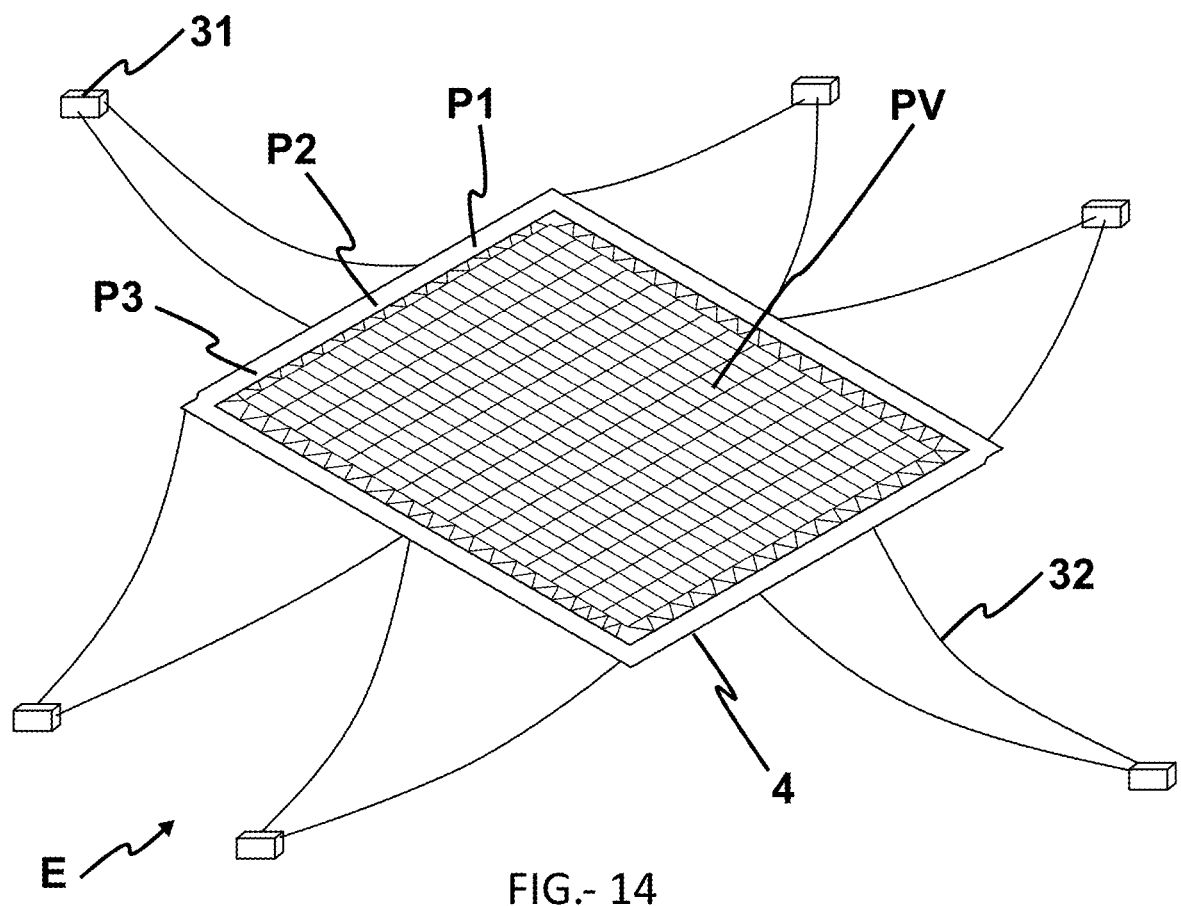
FIG. 14 is a perspective view of a structure made up of floating photovoltaic panels according to the present disclosure.

As illustrated in FIG. 14, the structure comprises mooring means 3 for mooring the structure E, the mooring means 3 comprising a plurality of weights 31 and ropes or rubber elements 32 connected at the lower end thereof to the weight 31.

The structure is completed with a semi-rigid floating frame 4, the upper end of each rope or rubber element 32 being connected to the floating frame 4. In particular, the upper end of each rope or rubber element 32 is connected to a mechanical connection between parts P of the floating frame 4. Each mechanical connection connects one end of a part P of the floating frame 4 to another part P of the floating frame 4. The mechanical connection of the parts P of the floating frame 4 is described in greater detail below with reference to FIGS. 11, 12 and 13.

Continuing with FIG. 14, each weight 31 is mechanically connected to two separate regions of the floating frame 4. Specifically, each weight 31 is mechanically connected to the parts P of the frame 4 by means of ropes or rubber elements 32. Specifically, each rope or rubber element 32 connects a weight 31 to a mechanical connection A1 made up of two parts P of the frame 4. More specifically, the weight 31 is mechanically connected to a mechanical connection between the part P1 of the frame 4 and the part P2 of the frame 4. Furthermore, the weight 31 is mechanically connected to a mechanical connection between the part P2 of the frame 4 and the part P3 of the frame 4.

Figure 2:
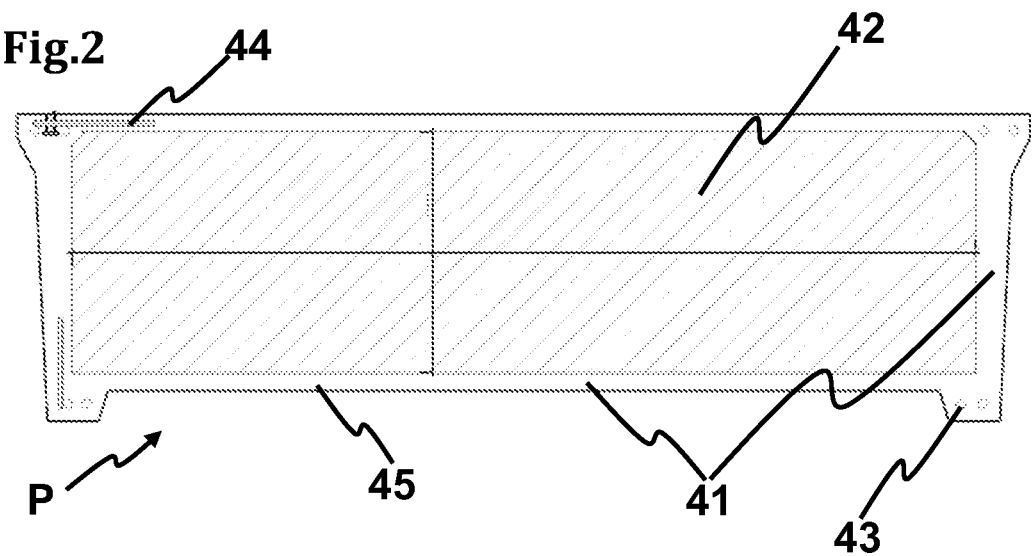
FIG. 2 shows a cross section of one of the parts that makes up the frame.

As shown in FIG. 2, the floating frame 4 is made up of a matrix of cementitious product 41 which fully or partially surrounds a volume of floating material 42.

Figure 4:
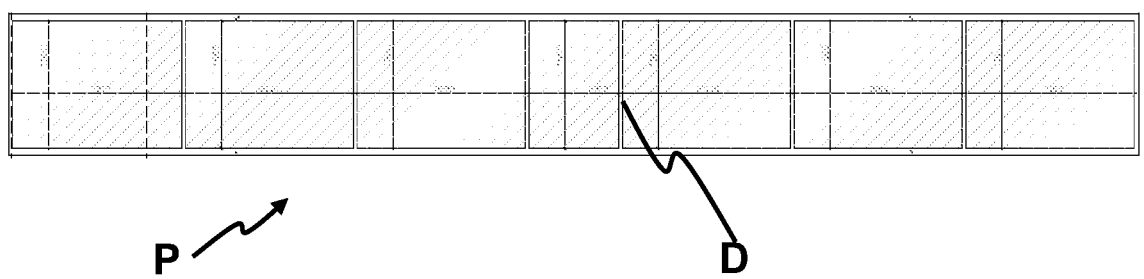
FIG. 4 shows the structure according to the disclosure in plan view.
Figure 5:
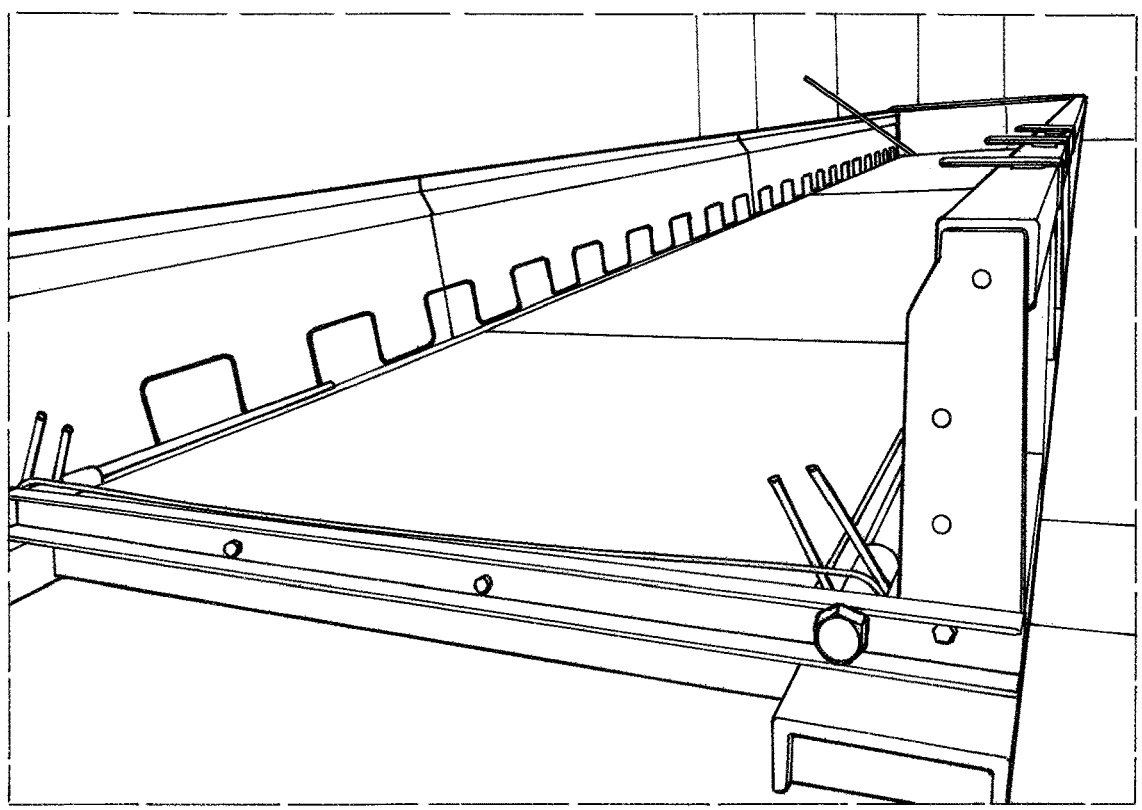
FIG. 5 shows the mould before pouring the lower slab.
Figure 6:
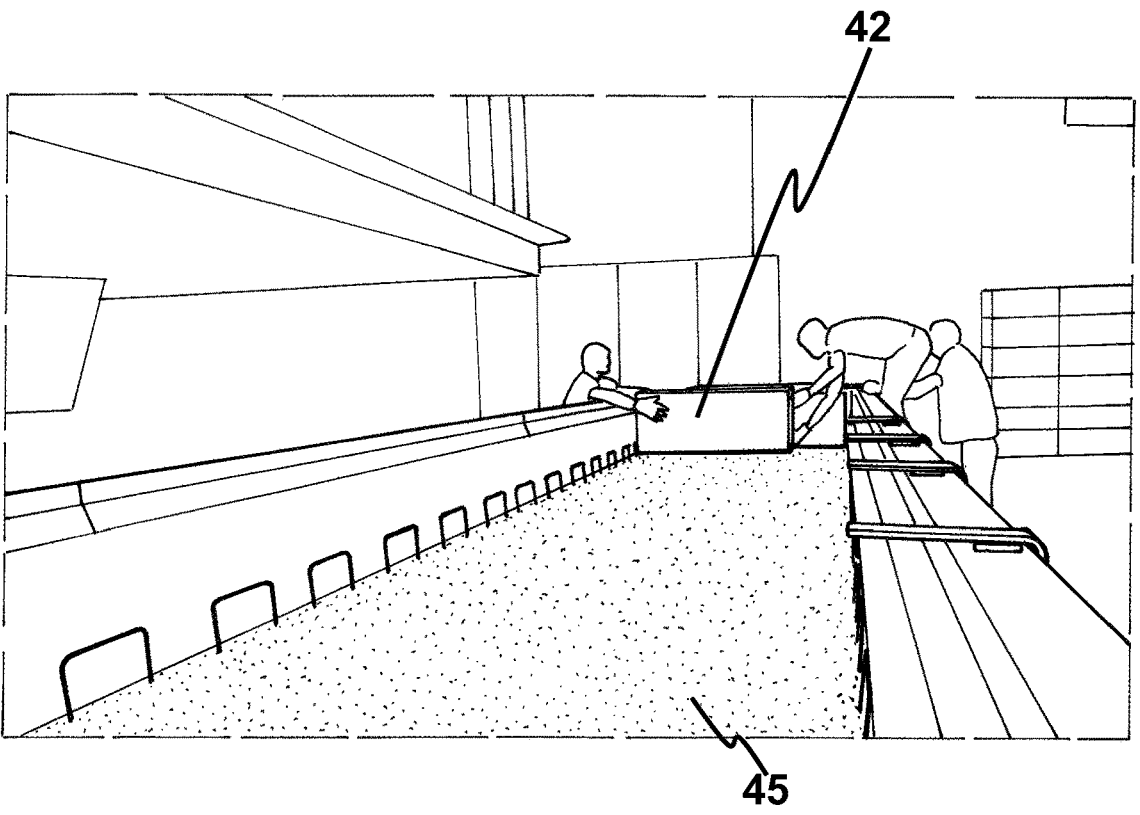
FIG. 6 shows the process of placing the blocks of lightening material on the layer of fresh concrete.
Figure 7:
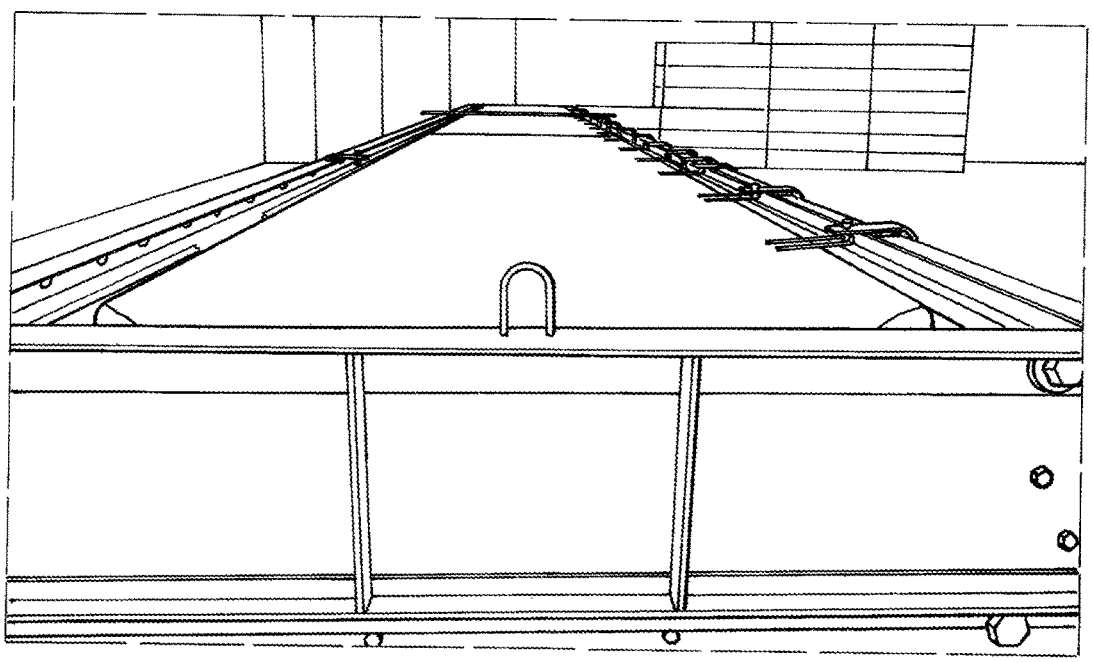
FIG. 7 shows the mould of the element after completing the phase of placing the lightening blocks, said mould prepared for the pouring of the second phase; the connection reinforcements for the fittings to which the lines of plastic floats of the installation will be tied are also shown on one side.
Figure 8:
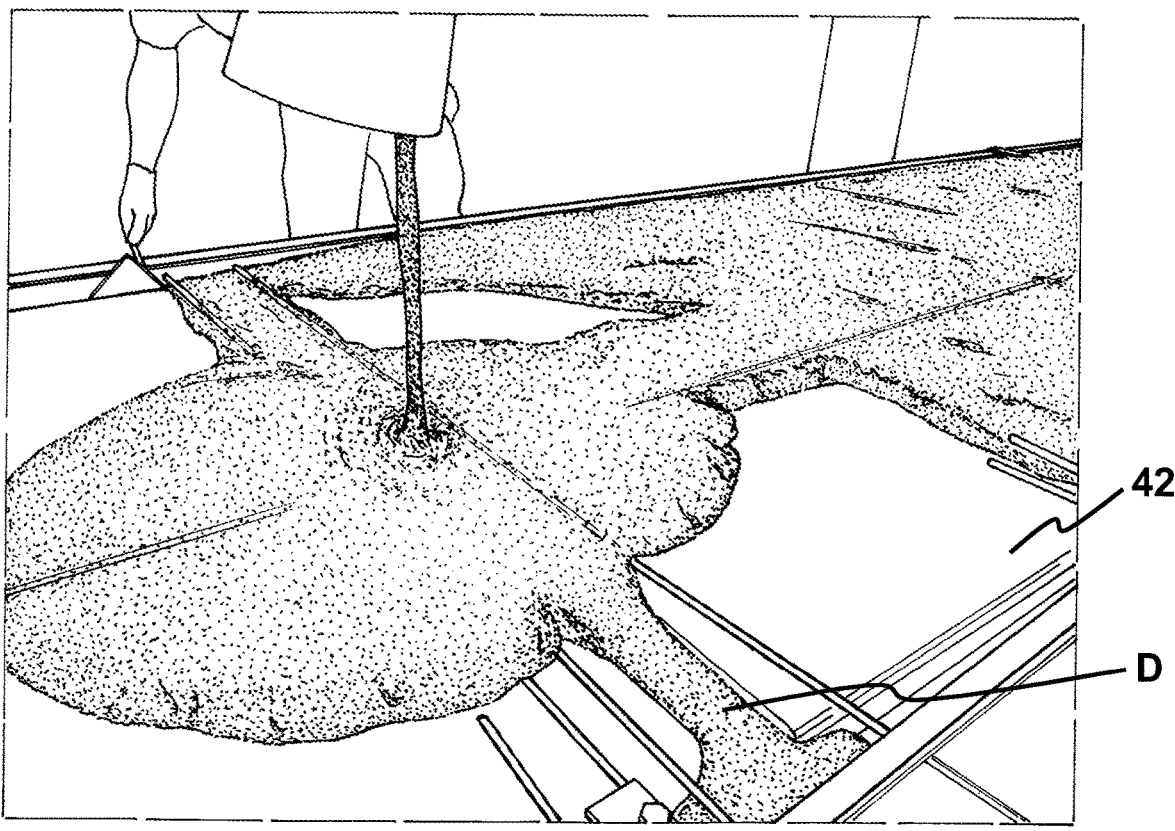
FIG. 8 shows the pouring of the second phase, pouring over one of the diaphragms D to facilitate the forward movement of the fresh material.
Figure 9:
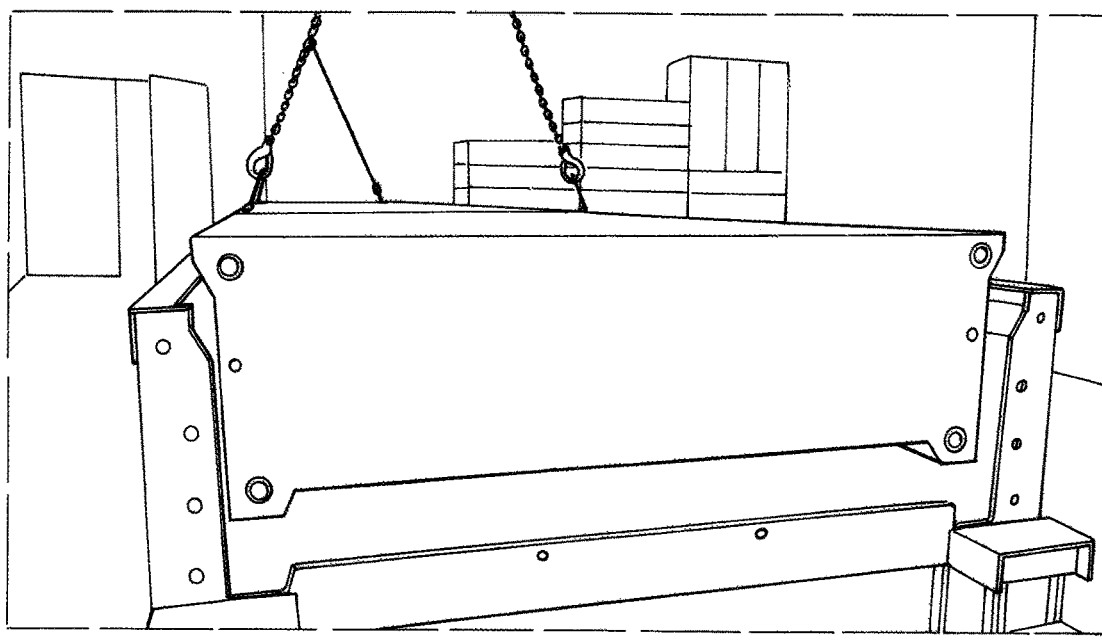
FIG. 9 shows a part during its removal from the mould, 16 hours after manufacture.
Figure 10:
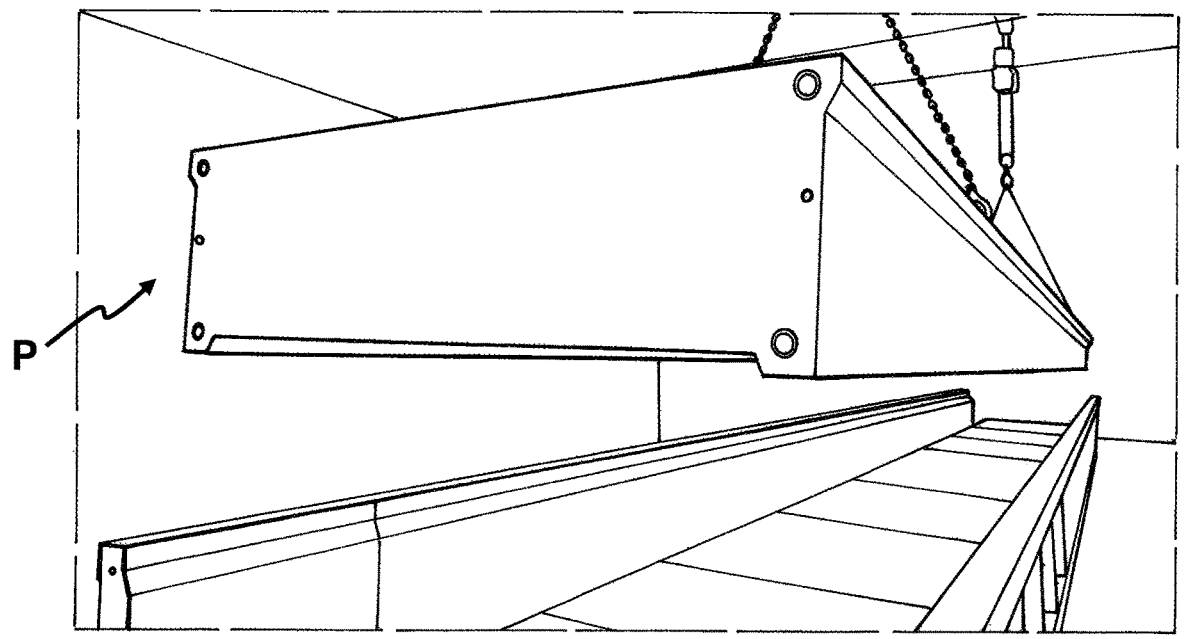
FIG. 10 shows a dock part finished and removed from the mould 16 hours after manufacture.

In the embodiment shown, the cementitious product 41 is a concrete with fibres in a content greater than 1% by volume, and more particularly an Ultra-High Performance Concrete. As shown in FIGS. 3 and 4, the frame is made up of parts with a length comprised between 13 and 14 m, a width comprised between 1.6 and 1.8 m, and a depth comprised between 0.4 and 0.6 m.

The frame 4 comprises longitudinal reinforcements 43 embedded in the cementitious material 41 to provide bending strength. It also comprises transverse reinforcements 44 intended to ensure the mechanical strength of the anchors between the frame and the plastic floats.

Manufacturing Process

For the dock to float, the density of the volume that it contains must be less than or equal to 1000 kg/m3. Therefore, the parts P are built to enclose a core 42 made of EPS, cork or other material with a density less than 1000 kg/m3. The most common manufacturing procedure is carried out in two steps, which are:

1) Placement of the steel reinforcements in the mould, pouring of the cementitious material of the lower slab 45. When the thickness intended for the lower slab is reached, pouring is stopped and the lightening element 42, which are properly sized blocks, is placed in the intended positions, becoming adhered to the cementitious material as it hardens.
2) After the material has hardened, usually the next day, fresh cementitious material is poured over the lightening element and into the gaps of the diaphragms D and this material slides down both sides and fills the entire part. The part can be removed the next day.

The procedure can also be carried out in a single step, although this requires that the lightening elements be adequately fixed in their position at the end of step 1 so that the pouring does not cause them to float due to the pressure of the fresh concrete.

The proposed stiffener made of cementitious material with fibres offers multiple advantages compared to a structure made with conventional concrete. The compactness of the proposed material makes it possible to eliminate secondary reinforcements and reduce primary reinforcement coatings, ensuring a lighter part and high durability even in aggressive environments. Furthermore, in the event that a crack appears, the high binder content allows for progressive self-healing of the same, which helps to ensure watertightness even after an accidental event that may have damaged the part. Compared to a structure made of steel, the advantage lies mainly in the greater durability of the stiffener made of cementitious material with fibres proposed herein, further reducing maintenance costs.

The manufacturing system is industrialised to facilitate the adaptation of the part to the mechanical and geometric requirements of the designed plant. It comprises a metal mould in which the position of one of the end caps can be modified in order to manufacture elements of a shorter length, such that the measurements of the plant do not need to be multiples of 13.40 m. The metal mould accepts different diameters of longitudinal reinforcements and connection sockets at the ends, thus allowing the reinforcements to be optimised for the bending and shear forces of each use.

The design of the mould allows bushings and fittings to be placed at the top. In this case, it has been designed with a line of bushings on one of the sides of the upper face, to which a rail will be connected and along which the moorings of the plastic floats can be hooked at any point.

Figure 11:
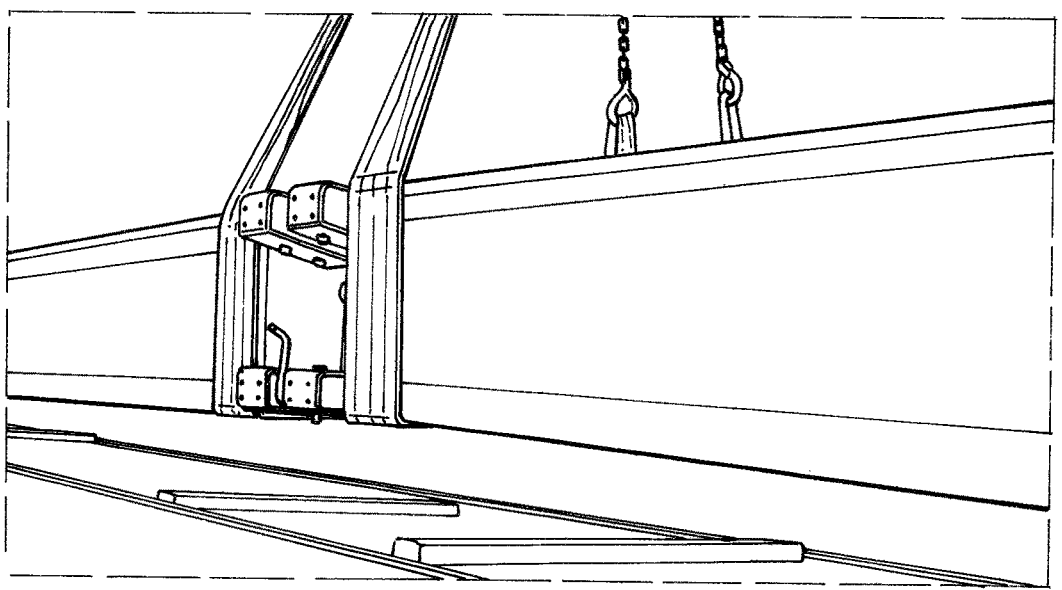
FIG. 11 is a perspective view of two parts of the frame mechanically connected and held by straps.
Figure 12:
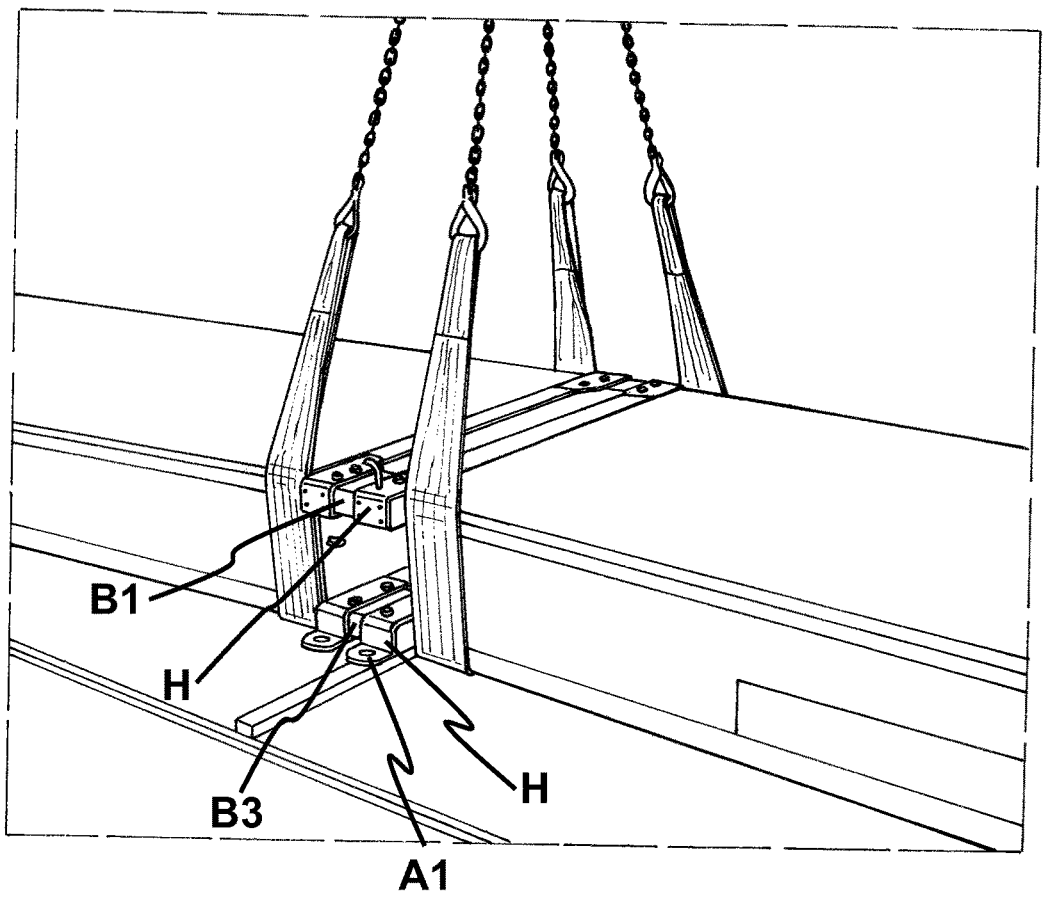
FIG. 12 is a perspective view of two parts of the frame mechanically connected and held by straps.
Figure 13:
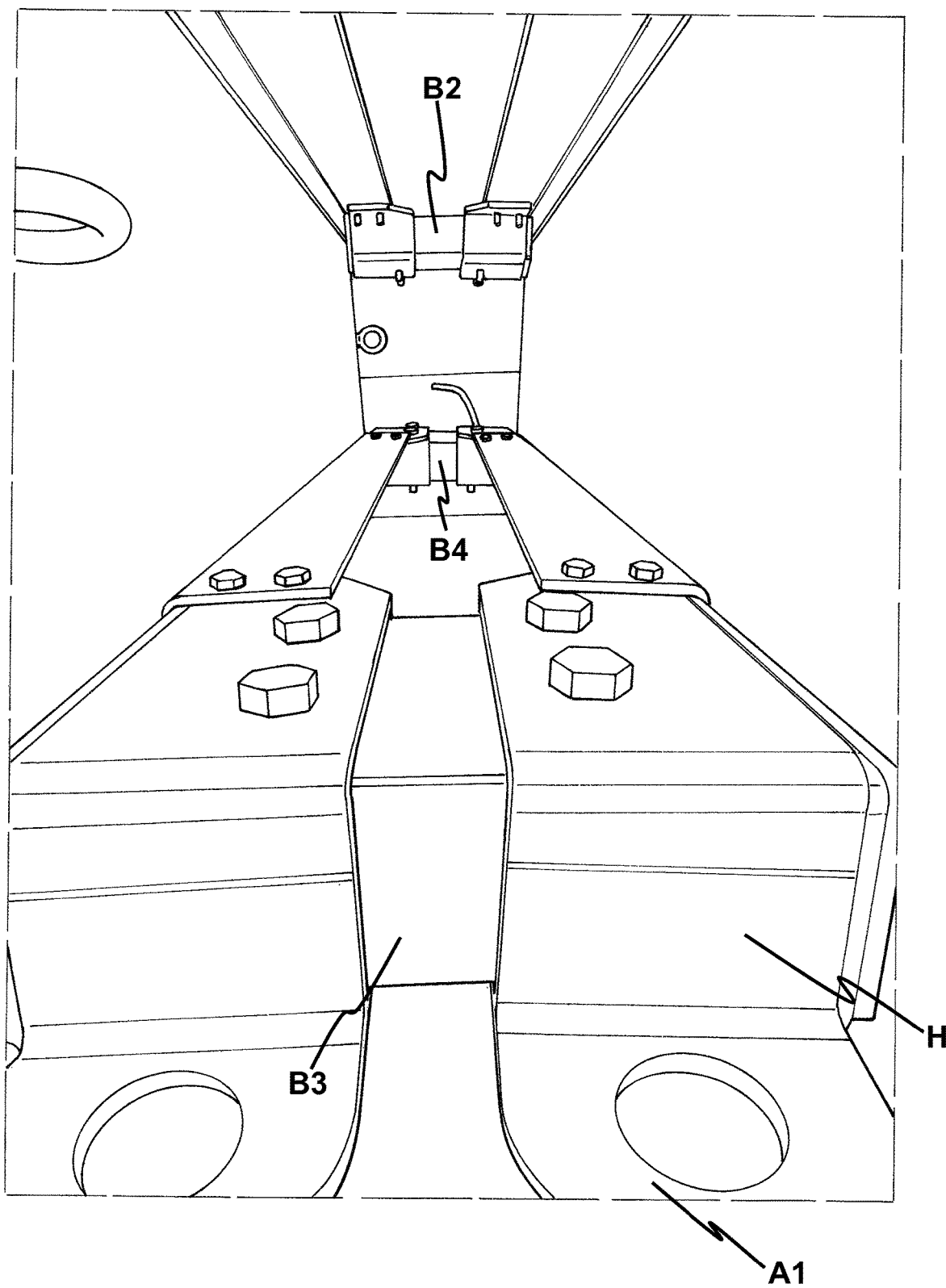
FIG. 13 is a perspective view of a mechanical connection between two parts of the frame.

As illustrated in FIGS. 11, 12 and 13, the mechanical connection between docks is established using two metal fittings, one in each of the parts to be connected. This fitting can be made of galvanised steel, stainless steel or aluminium. This fitting can be used to tie the rope that moors the structure to the bottom of the reservoir along the outer perimeter. The geometry of the fittings has been proposed so that it behaves as a pure tensile and compressive connection, and a rubber band is placed therebetween to provide the connection with the rotation capacity required for each use.

Continuing with FIG. 13, the mechanical connection between two parts P of the frame 4 mechanically connects one end of a part P to one end of a part P of the frame 4. Each mechanical connection comprises four blocks B1, B2, B3, B4, although in other embodiments that are not illustrated the number of blocks of each mechanical connection is a number other than four. Each block is mechanically fixed to one end of a part P of the frame 4 and to one end of another part P of the frame 4.

As illustrated in FIGS. 12 and 13, each mechanical connection comprises a first upper block B1, a second upper block B2, a third lower block B3 and a fourth lower block B4. The first upper block B1 is mechanically connected to the second upper block B2 by a first assembly of fittings, in particular tubular fittings fixed to the ends of the parts P. The third lower block B3 is mechanically connected to the fourth lower block B4 by a second assembly of fittings.

The first assembly of tubular fittings comprises metal sheets fixed to the first and second upper blocks B1, B2 by screws and/or pins. Some of the screws and/or pins pass through two metal sheets, mechanically connecting the sheets; other screws and/or pins pass through one metal sheet and the first or second upper block B1, B2, mechanically connecting the metal sheet and the upper block that have been passed through.

The second assembly of fittings comprises metal sheets fixed to the third and fourth lower blocks B3, B4 by screws and/or pins. Some of the screws and/or pins pass through two metal sheets, mechanically connecting the sheets; other screws and/or pins pass through one metal sheet and the third or fourth lower block B3, B4, mechanically connecting the metal sheet and the lower block that have been passed through.

As illustrated in FIGS. 12 and 13, several rings A1 can be fixed to one end of a part P of the frame 4. These rings A1 are intended for fixing anchor chains or ropes.

When the placement of fresh concrete is completed, silica sand with a maximum size of 0.8 mm is spread to minimise the slippery nature of the surface.

Figure 15:
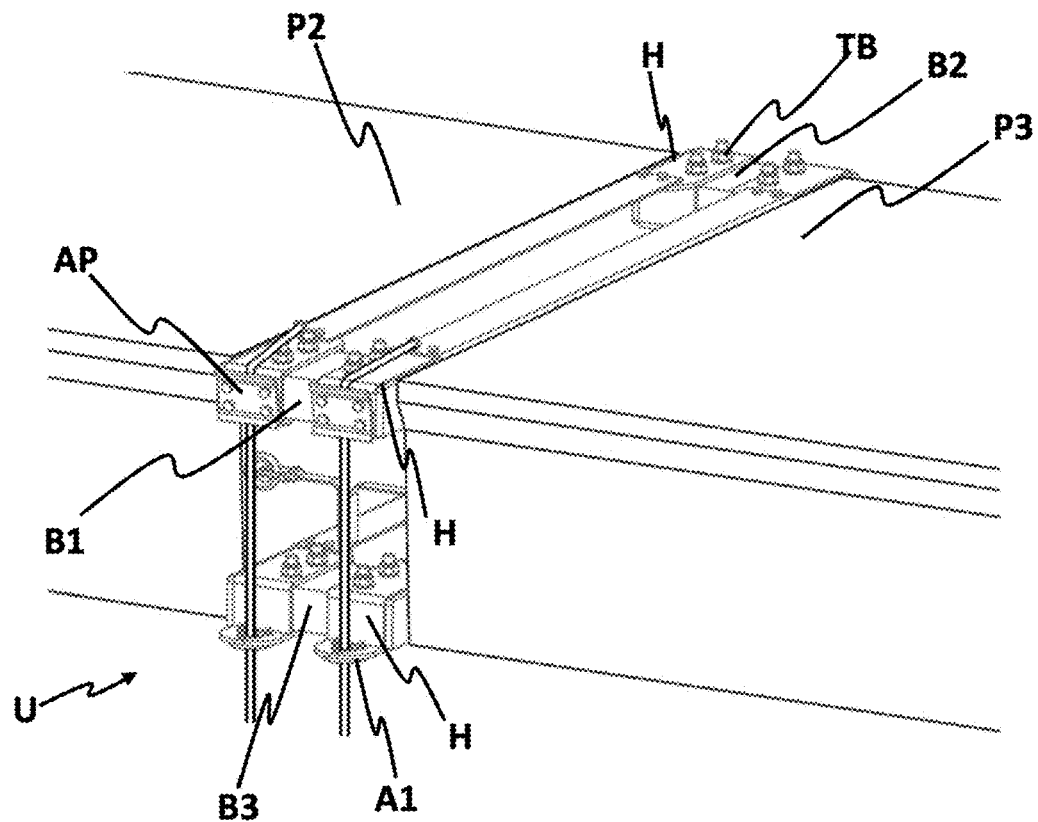
FIG. 15 is a perspective view of the connection system between parts of the floating frame.

FIG. 15 is a perspective view of the connection system between adjacent parts of the floating frame. The system is based on arranging in each corner of the U-shaped connection (referring to the four corners of a vertical rectangle) an assembly comprising:
  a fitting H firmly connected to each of the portions P2, P3 of the frame to be connected;
  an elastomeric block B1, B2 fitted into each of the fittings;
  fixing screws, preferably with a vertical axis, that connect the blocks B1, B2 to the fittings H. To this end, the fittings preferably comprise holes for housing the screws.

In some embodiments, it is preferred that the elastomeric blocks B1, B2 incorporate reinforcements, to improve the strength and extend the useful life thereof.

Another function of the fittings H is that of weaving or guiding the anchor ropes or chains to the bottom, so that they can be complemented with tightening plates AP (for the upper fittings H) and perforated semi-circular horizontal rings or extensions A1 (for the lower fittings).

This connection system, which constitutes an disclosure in itself, provides adequate rigidity, allowing the oscillations and vibrations caused by the waves to be absorbed and ensuring a firm connection of the elements that make up the frame.

Figure 16:
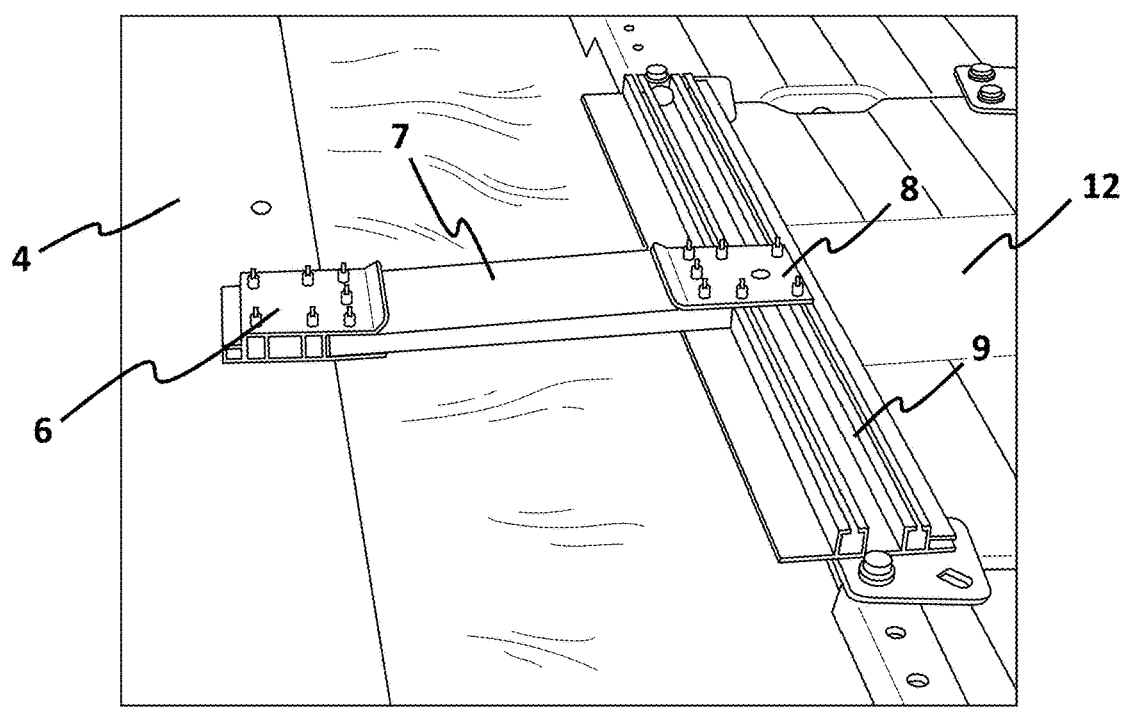
FIG. 16 is a perspective view of an embodiment of the means for connecting the perimeter floating frame to the floating plant or matrix.

FIG. 16 shows the connection between the perimeter frame P and the floating supports 12 of the photovoltaic panels of the structure E. This connection has a plurality of connection bands 7, for example made of a flexible material such as an elastomer with tensile and compressive strength, which connect the floating frame 4 and the floating support 12 and are distributed along the perimeter of the floating frame 4.

Along the length thereof on the inner side or in contact with the floating plant, the floating frame has specific holes or inserts for the placement and quick assembly of the connection system that connects the floating frame and the floating solar plant.

The anchors 6-8 are equal and symmetrical, and comprise a metal U-shaped profile having a fixed length and width into which the elastomeric band is inserted. These anchors 6-8 are connected to the dock in the pre-industrialised holes in the manufacture of the dock. Moreover, at the other end the U-shaped profile or terminal connects to the solar floating supports through the aluminium profile that connects the secondary floats of the perimeter of the floating plant. This aluminium profile has 2 longitudinal guides that allow the anchor 8 to be connected in a versatile manner following the fixed geometric pattern of the inserts of the floating frame.

Figure 17:
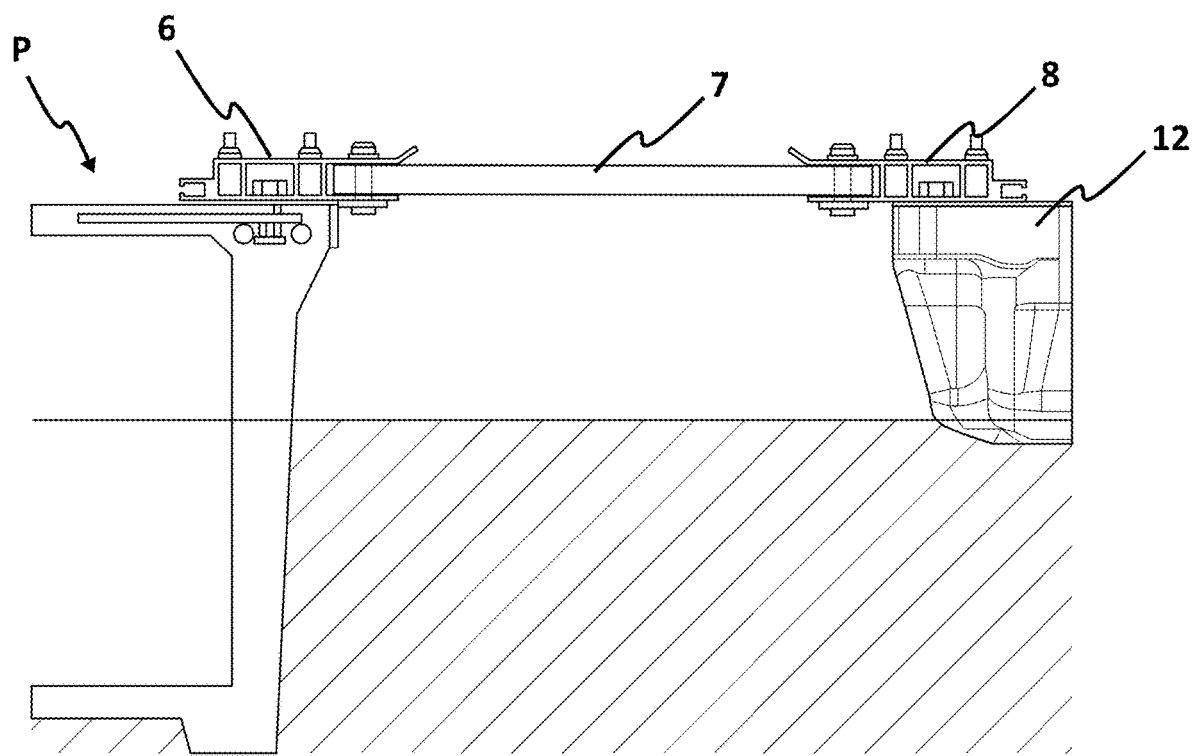
FIG. 17 is a cross-sectional view of a detail of the means for connecting the perimeter floating frame to the floating plant or matrix.

As shown in greater detail in FIG. 17, the connection between each brace 7 and the floating frame 4 is established by means of anchors 6, and in turn the connection between each brace 7 and the floating support 12 is established by means of others anchors 8 through an aluminium profile 9 connected to the floating support 12.

In a preferred embodiment, in addition to constituting a linear protective element for the photovoltaic panels, the floating frame 4 also serves as a means for supporting auxiliary elements and electrical equipment of the structure, such as, for example, electricity transformation centres, inverters, lighting, wiring etc.

In light of this description and figures, the person skilled in the art may understand that the disclosure has been described according to some preferred embodiments thereof, but that multiple variations may be introduced in said preferred embodiments without departing from the subject matter of the disclosure as claimed.

In this text, the term "comprises" and its derivations (such as "comprising", etc.) should not be understood in an excluding sense. That is, these terms should not be interpreted as excluding the possibility that what is described and defined may include more elements, steps, etc.

The invention claimed is:

1. A structure made up of floating photovoltaic panels, said structure comprising several assemblies made up of a photovoltaic panel and a floating support and connection means between the floating supports, so that the assemblies form a floating matrix, and mooring means for mooring the structure, the mooring means comprising a plurality of weights and ropes or rubber elements connected at the lower end thereof to the weight, and the structure comprising a floating frame, the upper end of each rope or rubber element being connected to the floating frame, wherein the floating frame is made up of a matrix of cementitious product which fully or partially surrounds a volume of floating material, wherein the frame is made up of parts with a length comprised between 13 and 14 m, a width comprised between 1.6 and 1.8 m, and a depth comprised between 0.4 and 0.6 m, wherein the parts are connected by blocks and connection fittings between the blocks and the ends of the parts, wherein the fittings are tubular so that they define spaces for housing the blocks, the blocks being fixed to the fittings by screws.

2. The structure according to claim 1, wherein the cementitious product is a concrete with fibres.

3. The structure according to claim 1, wherein the cementitious product is an Ultra-High Performance Concrete (UHPC).

4. The structure according to claim 2, wherein the fibres are made of steel and are present in a content greater than 1% by volume.

5. The structure according to claim 1, wherein a maximum aggregate size is less than 8 mm and/or wherein a water/cement ratio is less than 0.35.

6. The structure according to claim 1, wherein the frame is made up of parts with a length of 13.4 m, a width of 1.82 m, and a height of 0.51 m.

7. The structure according to claim 1, wherein the floating material is expanded polystyrene.

8. The structure according to claim 1, which comprises longitudinal reinforcements embedded in the cementitious material.

9. The structure according to claim 1, wherein the fittings comprise perforated plates, so that they constitute anchor rings.

10. The structure according to claim 1, which has a plurality of bands that connect the floating frame and the floating support and are distributed along the perimeter of the floating frame.

11. The structure according to claim 10, wherein the bands are made of a flexible material.

12. The structure according to claim 1, further including at least one of the following elements: an electricity transformation centre, an inverter, lighting or wiring means, installed or housed in the floating frame.

* * * * *